US008812674B2

(12) United States Patent
Guenter (10) Patent No.: US 8,812,674 B2
(45) Date of Patent: Aug. 19, 2014

(54) CONTROLLING STATE TRANSITIONS IN A SYSTEM (75) Inventor: Brian K. Guenter, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 742 days.

(21) Appl. No.: 12/716,274

(22) Filed: Mar. 3, 2010

(65) Prior Publication Data

US 2011/0218653 A1 Sep. 8, 2011

(51) Int. Cl.
| G06F 15/16 | (2006.01) |
| G06F 1/00 | (2006.01) |
| G06F 1/26 | (2006.01) |
| G06F 1/32 | (2006.01) |
| G05B 13/02 | (2006.01) |
| G05D 17/00 | (2006.01) |

(52) U.S. Cl.
USPC ........... 709/226; 709/203; 713/300; 713/320; 713/321; 713/322; 713/323; 700/28; 700/29; 700/37; 700/286; 700/291; 700/297

(58) Field of Classification Search
USPC .................. 709/203, 226; 713/300, 320–323; 700/28–29, 37, 286, 291, 297
See application file for complete search history.

(56) References Cited

U.S. PATENT DOCUMENTS

| 5,311,421 A * | 5/1994 | Nomura et al. ................. 700/37 |
| 7,135,956 B2 | 11/2006 | Bartone et al. |
| 7,210,048 B2 | 4/2007 | Bodas |
| 7,433,144 B2 * | 10/2008 | Singer ............................ 360/69 |
| 7,551,985 B1 * | 6/2009 | Chen et al. ..................... 700/297 |
| 8,024,590 B2 * | 9/2011 | Song et al. ..................... 713/321 |
| 8,155,795 B2 * | 4/2012 | Ohuchi et al. ................. 700/291 |
| 8,245,059 B2 * | 8/2012 | Jackson ........................ 713/300 |
| 2002/0194251 A1 * | 12/2002 | Richter et al. ................ 709/105 |
| 2003/0046396 A1 * | 3/2003 | Richter et al. ................ 709/226 |
| 2003/0188208 A1 * | 10/2003 | Fung ............................. 713/320 |
| 2003/0193777 A1 | 10/2003 | Friedrich et al. |
| 2003/0200473 A1 * | 10/2003 | Fung ............................. 713/320 |
| 2004/0230848 A1 | 11/2004 | Mayo et al. |

(Continued)

OTHER PUBLICATIONS

Rasmussen, Neil, "Implementing Energy Efficient Data Centers," retrieved at <<http://www.apcmedia.com/salestools/NRAN-6LXSHX_R0_EN.pdf>>, American Power Conversion, White Paper No. 114, 2006, 15 pages.

(Continued)

*Primary Examiner* — Liangche A Wang
*Assistant Examiner* — John Isom
(74) *Attorney, Agent, or Firm* — Steve Wight; Carole Boelitz; Micky Minhas (57) ABSTRACT

A control system is described for controlling the operation of a target system, such as a data center. The control system uses a prediction module to predict demand for resources of the target system for future time steps. The control system then uses a transition determination module to determine state transitions within the target system to address the predicted demand. Each state transition describes a number of units to be advanced from a first state, at a first time step, to a second state, at a second time step. The control system then commences those state transitions which begin in the current step, and then repeats the predicting and determining for a next time step. The transition determination module can determine the state transitions by operating on an objective function that includes a demand difference component and a cost component, as subject to a set of conservation equations.

20 Claims, 9 Drawing Sheets

(56) References Cited

U.S. PATENT DOCUMENTS

| | | | |
|---|---|---|---|
| 2005/0108582 A1* | 5/2005 | Fung | 713/300 |
| 2006/0248324 A1* | 11/2006 | Fung | 713/1 |
| 2006/0248325 A1* | 11/2006 | Fung | 713/1 |
| 2006/0248358 A1* | 11/2006 | Fung | 713/300 |
| 2006/0248359 A1* | 11/2006 | Fung | 713/300 |
| 2006/0248360 A1* | 11/2006 | Fung | 713/300 |
| 2006/0248361 A1* | 11/2006 | Fung | 713/300 |
| 2007/0021873 A1* | 1/2007 | Richards | 700/286 |
| 2007/0078635 A1 | 4/2007 | Rasmussen et al. | |
| 2007/0168057 A1* | 7/2007 | Blevins et al. | 700/53 |
| 2008/0307240 A1* | 12/2008 | Dahan et al. | 713/320 |
| 2009/0018705 A1* | 1/2009 | Ouchi et al. | 700/291 |
| 2009/0144568 A1* | 6/2009 | Fung | 713/300 |
| 2009/0251860 A1 | 10/2009 | Belady et al. | |
| 2011/0093253 A1* | 4/2011 | Kraft et al. | 703/21 |
| 2011/0161627 A1* | 6/2011 | Song et al. | 712/30 |
| 2012/0144219 A1* | 6/2012 | Salahshour et al. | 713/322 |

OTHER PUBLICATIONS

Moore, et al., "Data Center Workload Monitoring, Analysis, and Emulation," retrieved at <<http://issg.cs.duke.edu/publications/caecw2005.pdf>>, Eighth Workshop on Computer Architecture Evaluation using Commercial Workloads, 2005, 8 pages.

Moore, et al., "Weatherman: Automated, Online, and Predictive Thermal Mapping and Management for Data Centers," retrieved at <<http://www.cs.duke.edu/~justin/papers/icac06weatherman.pdf>>, Proceedings of the 2006 IEEE International Conference on Autonomic Computing, 2006, 10 pages.

Bertsimas, et al., Introduction to Linear Optimization, Athena Scientific, 1997, Amazon.com book description, retrieved at <<http://www.amazon.com/Introduction-Linear-Optimization-Scientific-Computation/dp/1886529191/ref=sr_1_1?ie=UTF8&s=books&qid=1267274084&sr=1-1>>, retrieved on Feb. 25, 2010, 15 pages.

Meyer, Carl D., Matrix Analysis and Applied Linear Algebra Book and Solutions Manual, SIAM: Society for Industrial and Applied Mathematics, 2001, Amazon.com book description, retrieved at <<http://www.amazon.com/Matrix-Analysis-Applied-Algebra-Solutions/dp/0898714540/ref=sr_1_1?ie=UTF8&s=books&qid=1267274388&sr=1-1>>, retrieved on Feb. 25, 2010, 8 pages.

Vaidyanathan, P. P., The Theory of Linear Prediction, Morgan and Claypool Publishers, 2008, Amazon.com book description, retrieved at <<http://www.amazon.com/Theory-Prediction-Synthesis-Lectures-Processing/dp/1598295756/ref=sr_1_1?ie=UTF8&s=books&qid=1267274715&sr=1-1>>, retrieved on Feb. 25, 2010, 5 pages.

\* cited by examiner

CONTROLLING STATE TRANSITIONS IN A SYSTEM

BACKGROUND

A data center may be designed to meet at least two objectives. First, the data center may be configured to satisfy demand for its services in a satisfactory manner. Second, the data center may be configured to reduce energy costs. These goals can present competing objectives. For example, from the end-user's perspective, it may be beneficial to operate an overly-conservative number of computing machines in a ready state to satisfy demand. This approach, however, may waste power if some of these machines remain powered up, yet idle.

One solution is to monitor demand at each time step and power up a suitable number of machines to service that prevailing demand. However, this solution is not fully satisfactory. It takes a certain amount of time to bring a computing machine into service, and a certain amount of time to turn such a machine off. Hence, this approach may fail to satisfy demand (and energy cost) objectives in a timely manner, as the data center is placed in a perpetual position of playing "catch up."

Other environments (besides data centers) may present similar control-related challenges.

SUMMARY

An illustrative control system is described herein for controlling the operation of a target system. The target system may correspond to (but is not limited to) a data center having a plurality of computing units for servicing requests by users. The control system may operate by: (a) for a current time step, predicting demand for resources of the target system, to provide predicted demand for a plurality of future time steps; (b) for the current time step, determining state transitions within the target system to address the predicted demand, to provide a plurality of state transitions; (c) commencing state transitions which begin in the current step, each transition taking a respective time interval to perform; and (d) repeating the predicting, determining, and commencing at a next current time step. Each state transition describes a number of units to be advanced from a first state, at a first time step, to a second state, at a second time step.

According to another illustrative aspect, a prediction module can perform the prediction operation by: (a) receiving a set of demand measurements associated with past demand experienced by the target system; and (b) using the set of demand measurements to provide the predicted demand. In one illustrative implementation, the prediction module uses a linear prediction technique to predict demand.

According to another illustrative aspect, a transition determination module can determine the state transitions by: (a) formulating an objective function that expresses a control objective to be achieved with the target system; and (b) operating on the objective function using a solving technique to achieve the control objective and, in doing so, provide the state transitions.

According to another illustrative aspect, the objective function can include at least two components: a demand difference component and a cost component. The demand difference component expresses a sum of demand differences, each demand difference expressing a difference, for a particular time step, between unit demand and a number of units operating in a specified state for satisfying the unit demand. The cost component expresses a cost (such as an energy consumption cost) associated with making the state transitions.

According to another illustrative aspect, the transition determination module can operate on the objective function subject to a set of conservation equations. The conservation equations express flow constraints associated with the state transitions over a span of time.

Overall, the control system may have the benefit of efficiently controlling both demand for resources and cost considerations. The control system implicitly takes into account the time lags associated with state transitions.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative control system which controls state transitions in a target system of any type, such as a data center. Section B describes illustrative methods which explain the operation of the control system of Section A. Section C describes illustrative processing functionality that can be used to implement any aspect of the features described in Sections A and B.

Figure 12:
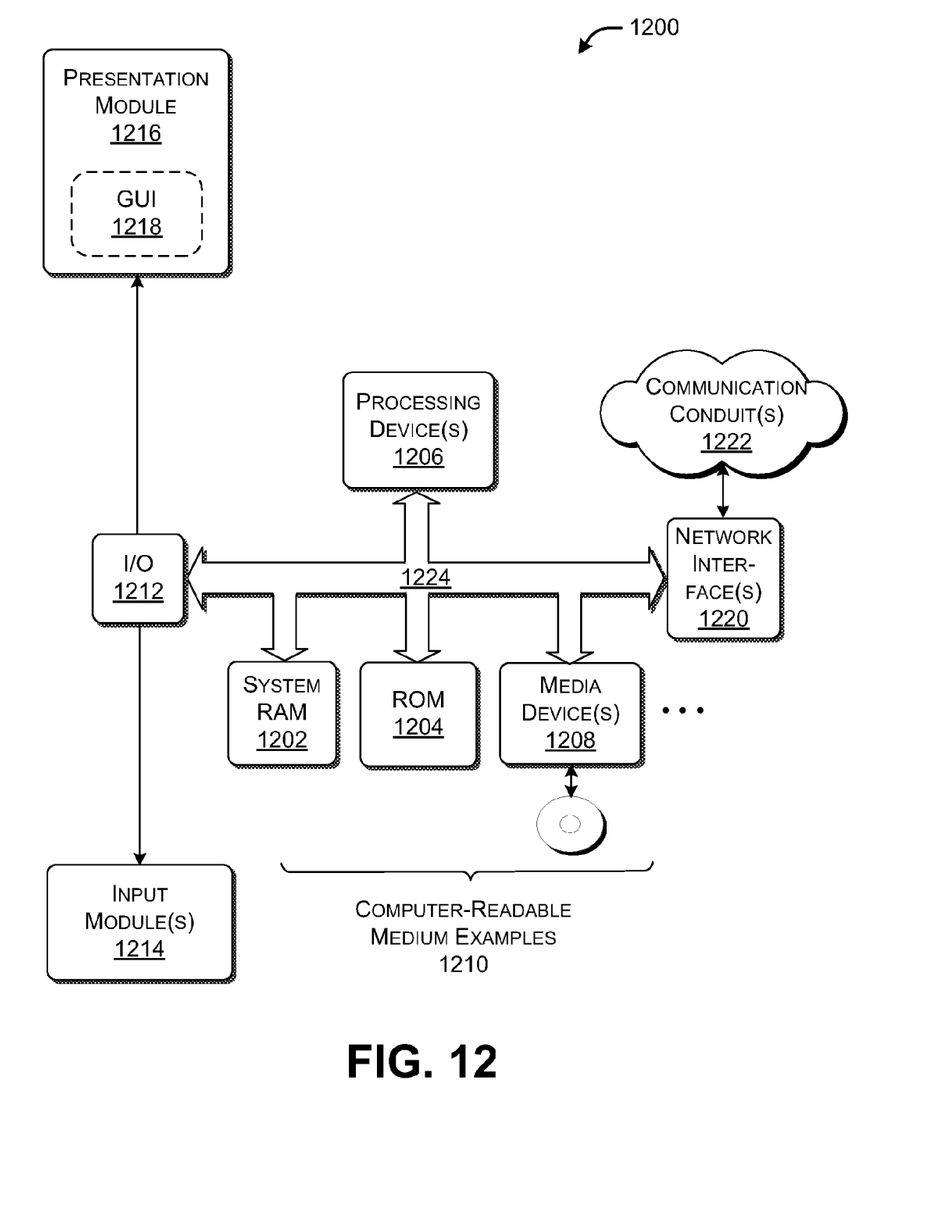
FIG. 12 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 12, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Control System

A.1. System Overview

Figure 1:
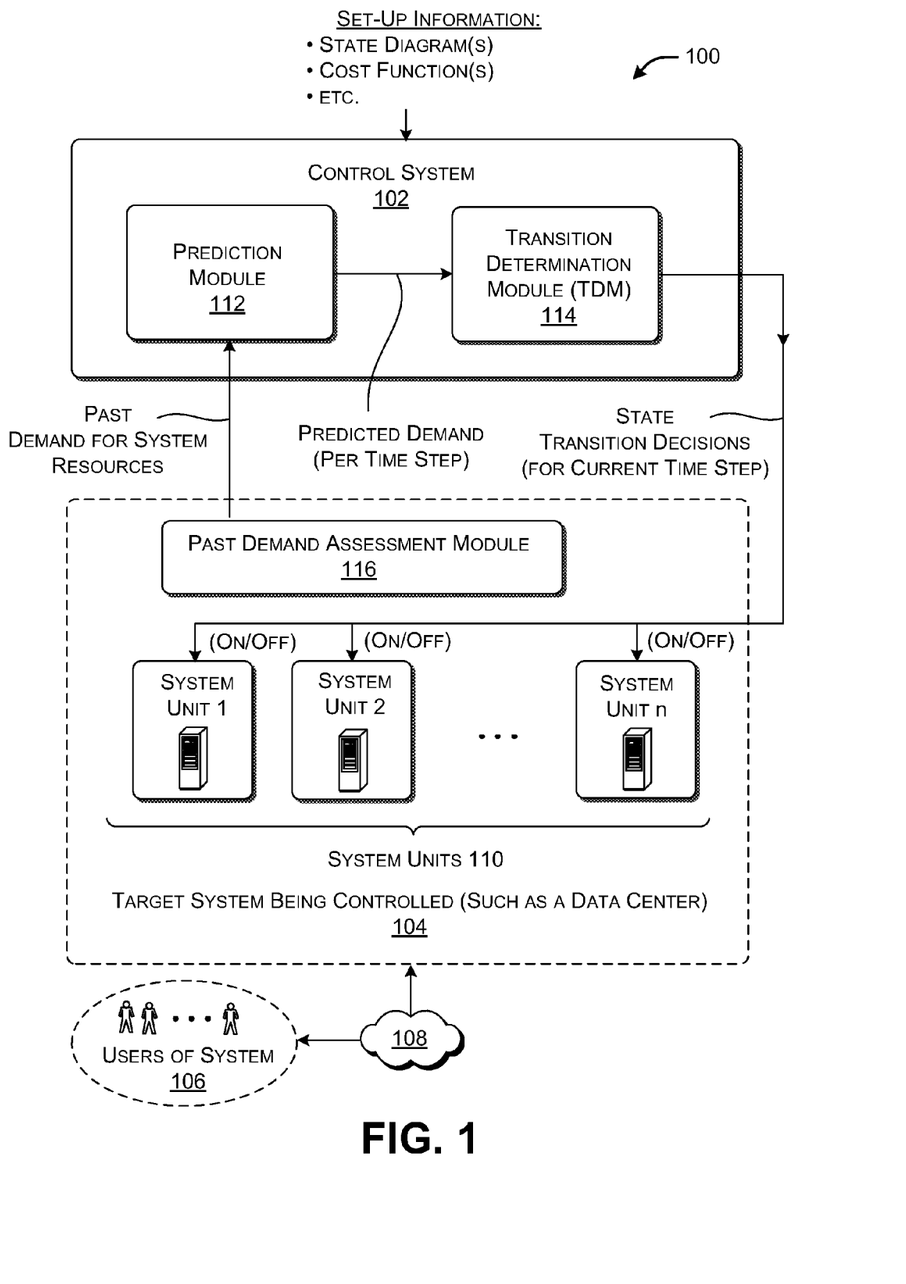
FIG. 1 shows an illustrative environment for controlling state transitions in a target system of any type, such as a data center.

FIG. 1 shows an illustrative environment 100 in which a control system 102 is used to control state transitions in a target system 104 (that is, a system which is the target of control). In one case, the target system 104 may correspond to a data center. In this context, the target system 104 may provide any type of computing resources for use by a group of users 106 via a network 108 (such as the Internet). For example, the target system 104 may provide storage and/or processing resources to the users 106, upon request by the users 106.

The target system 104 can include any collection of units 110 for performing any function or combination of functions. The units 110 can be implemented in any manner (e.g., using hardware, software, or combination thereof). In one case, the units 110 may correspond to distinct devices for performing prescribed functions, such as computer servers of any type. Alternatively, or in addition, the units 110 can correspond to individual components within more encompassing machines.

The control system 102 will first be described based on the initial assumption that all of the units 110 have the same characteristics. More specifically, assume that each of the units 110 exhibits behavior described by FIG. 2. This figure shows a state transition diagram that is characterized by two operational states. A first state (On) corresponds to a condition in which a unit is powered on and ready to process user requests. A second state (Off) corresponds to a state in which the unit is powered off, and is therefore not ready to process user requests.

Figure 2:
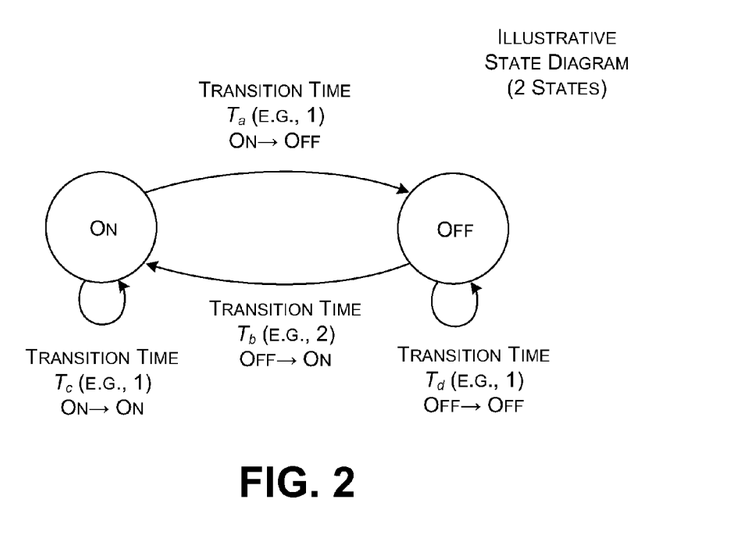
FIG. 2 shows an illustrative state diagram for a type of computing unit to be controlled having two states.

This diagram represents state transitions by paths which connect the two states. Each state transition takes a finite amount of time to complete. This time is quantized into time steps having any value deemed to be appropriate for a particular environment (e.g., fractions of a second, seconds, minutes, etc.). For example, assume that a path which connects the On state to the Off state takes time $T_a$ to complete. In this explanation, it will be assumed that $T_a=1$ time steps. A path that connects the Off state to the On state is assumed to take $T_b=2$ time steps to complete. Furthermore, a unit that is On may stay On, and a unit that is Off may stay Off. The "transitions" between these states can be conceptualized as consuming one time step, e.g., $T_c=1$ and $T_d=1$.

Figure 3:
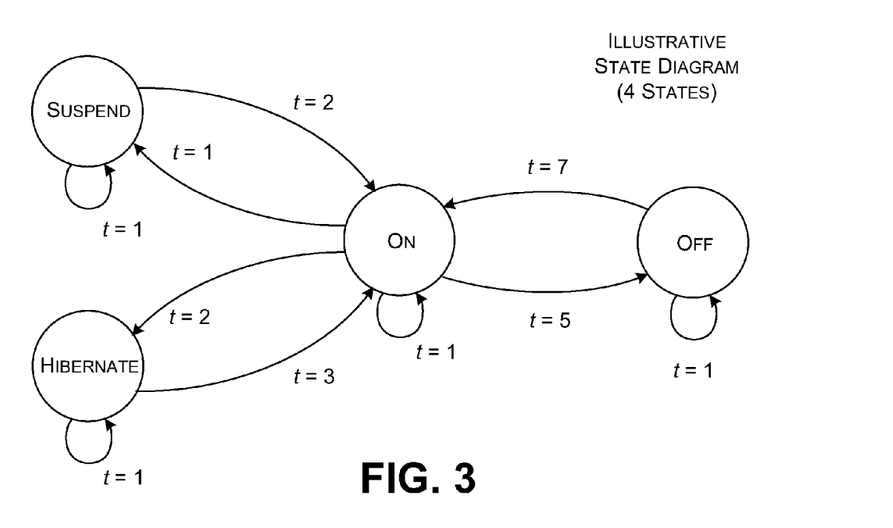
FIG. 3 shows an illustrative state diagram for a type of computing unit to be controlled having four states.

The units associated with other systems may be characterized by different transition times. Furthermore, the units associated with other systems can be characterized by more than two operational states. For example, FIG. 3 shows an illustrative state diagram that describes a unit having four states. That is, in addition to On and Off states, this type of unit has a Suspend state and a Hibernate state, which correspond to two types of low-power states in which the unit is not completely turned off. Furthermore, as will be described in Section A.4, a target system can combine different types of units together that are characterized by different state diagrams. However, to facilitate explanation, the ensuing description first sets forth the operation of control system 102 for the case in which all of the units 110 exhibit behavior described by the two-state diagram of FIG. 2.

Returning to FIG. 1, the control system 102 itself can include (or can be conceptualized as including) two components: a prediction module 112 and a transition determination module (TDM, for brevity) 114.

The prediction module 112 operates by, at each current time step, predicting demand for resources within the target system 104 for a plurality of future time steps $(1, \ldots, k)$. It performs this task by receiving measurements of past demand for resources. It then uses a prediction technique to predict the future demand for resources based on the past demand for resources. Without limitation, the prediction module 112 can use a linear prediction technique to perform its role. Section A.2 provides additional illustrative details regarding the operation of the prediction module 112.

The prediction module 112 can receive the measurements of past demand from a demand assessment module 116. The demand assessment module 116 can provide demand measurements in any manner. In one case, the demand assessment module 116 can form a metric which represents actual requests being made by the users 106, and/or the actual processing load placed on the units 110 by the requests, etc.

The transition determination module (TDM) 114 operates by, at each current time step, determining state transitions that can be performed by the units 110 in the target system 104 to address the demand assessed by the prediction module 112. As will be described in greater detail in Section A.3, the TDM 114 formulates each state transition decision as a value $x_{s_i u_j}$. This decision identifies a number of units that are to be changed from a first state (s) at a first time step (i) to a second state (u) at a second time step (j). For example, a decision to change ten units from the Off state at time step 0 to the On state at time step 2 is represented by $x_{off_0 On_2}=10$. This transition spans two time steps because FIG. 2 shows that it takes two time steps to turn a unit from Off to On. By way of terminology, the phrases "state transition" and "state transition decision" will be used interchangeably (when describing the operation of the TDM 114).

At each time step, the TDM 114 commences that subset of state transition decisions that begin in the current time step. The control system 102 then repeats the above-described process for another time step. That is, for the next current time step, the prediction module 112 makes another prediction of future demand, and the TDM 114 determines another set of state transitions. At a subsequent time step, the TDM 114 is constrained by prior decisions that are currently in progress (as will be described in greater detail below).

The TDM 114 operates by formulating an objective function. The TDM 114 then operates on the objective function to determine the state transitions. The objective function can include a demand difference component and a cost component. The TDM 114 also operates on the objective function subject to one or more constraints, such as a series of conservation equations that express flow constraints associated with the state transitions over a span of time. Again, Section A.3 will provide further illustrative details regarding these features of the TDM 114.

A.2. Illustrative Prediction Module

Figure 4:
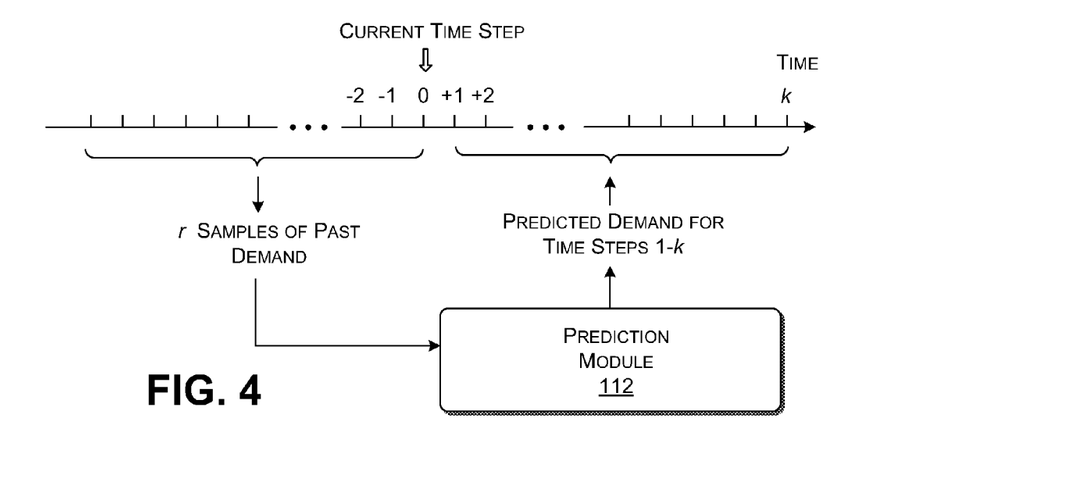
FIG. 4 shows illustrative details of a prediction module used by a control system in the environment of FIG. 1.

FIG. 4 shows additional illustrative detail regarding the operation of the prediction module at a current time step, e.g., time step 0. As indicated there, the prediction module 112 can receive a plurality of measurements of past demand from the demand assessment module 116. The prediction module 112 uses the demand measurements to predict future demand for a plurality of future time steps, e.g., for time steps 1 through k.

The prediction module 112 can use any technique (or combination of techniques) to perform its prediction role. In one case, it uses a linear prediction technique. In this technique, the prediction module 112 uses measured values of past unit demand $m_i$, where $i \leq 0$, to compute p coefficients (a) of a linear predictor, given by:

$$a = [a_1, \ldots, a_p]^T.$$

The predicted demand, $\hat{m}_0$, is then given by the dot product of a with a vector of previous machine demand measurements:

$$\hat{m}_0 = a^T \begin{bmatrix} m_{-p} \\ \vdots \\ m_{-1} \end{bmatrix}.$$

The prediction module 112 can compute the coefficients of a by solving the least squares problem, Ma=m, that is:

$$\begin{bmatrix} m_{-(r+p)} & \cdots & m_{-(r-1)} \\ \vdots & \ddots & \vdots \\ m_{-p} & \cdots & m_{-1} \end{bmatrix} a = \begin{bmatrix} m_{-r} \\ \vdots \\ m_0 \end{bmatrix}.$$

The number of coefficients, p, and the number of past samples, r, are chosen large enough to capture the long-term behavior of the target system 104, with r>>p to prevent overfitting of the prediction module 112 to a small sample of previous demand measurements. Without limitation, in one illustrative environment, the prediction module 112 can select values of p, k, and r, such that $p \leq 10$, $k \leq 20$, and $r \leq 100$.

More specifically, the prediction module 112 forms a prediction for each time step (1, ..., k). This means that the prediction module 112 forms a set of coefficients for each time step, i.e., $(a_1, \ldots a_k)$. This, in turn, involves solving k least square problems.

In one approach, the prediction module 112 can directly solve the least square equations using the singular value decomposition (SVD) technique:

$$\text{SVD}(M) = U\sigma V^T.$$

Here, U and V are orthonormal matrices and σ is a diagonal matrix with singular values along its diagonal. Greater immunity to noise can be achieved by discarding small singular values of $\sigma_i$ before inverting $U\sigma V^T$ to solve for a. That is:

$$\sigma_{ii} = \begin{cases} \sigma_i, & \text{if } \frac{\sigma_0}{\sigma_i} \leq s_{max} \\ 0 & \text{otherwise.} \end{cases}$$

Without limitation, in one case, the prediction module 112 can use $s_{max} = 100$. In addition to least squares linear prediction, the prediction module 112 can use an absolute value linear predictor (using an L1 norm instead of an L2 norm for the errors). This type of predictor can be expected to be less sensitive to outliers, that is, occasional values that depart from the norm to a significant extent. The coefficients of the absolute value linear predictor can be solved using a linear programming technique.

Moreover, the prediction module 112 can use other techniques to predict demand besides a linear prediction technique. For example, the prediction module 112 can use a statistical modeling technique, an artificial intelligence technique, a neural network technique, and so on, or combination thereof.

A.3. Illustrative Transition Determination Module

Figure 5:
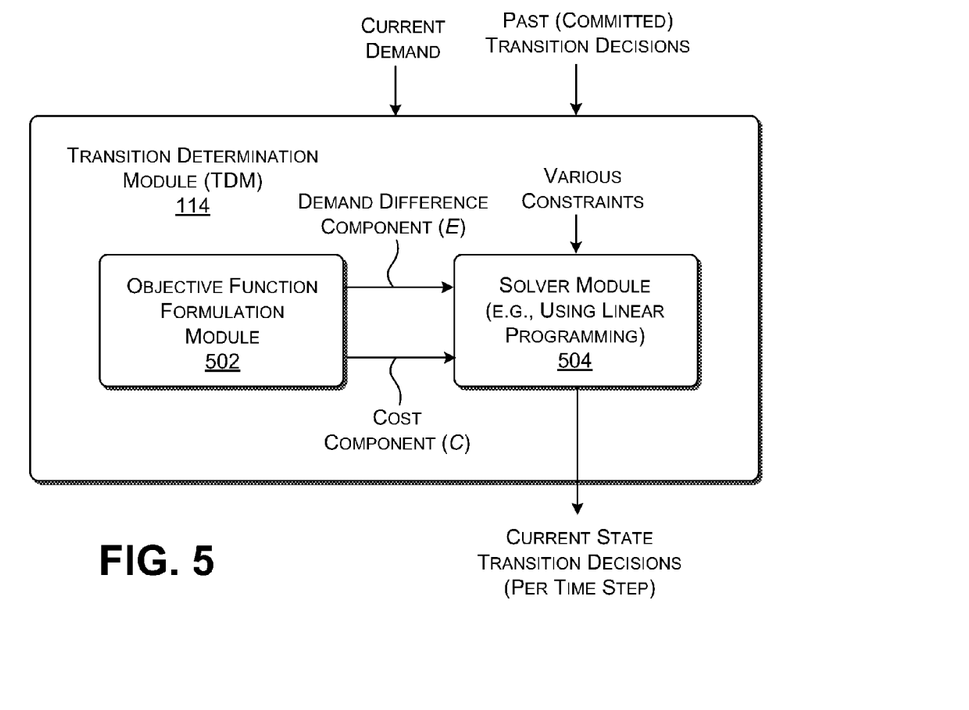
FIG. 5 shows illustrative details of a transition determination module used by the control system.

FIG. 5 shows one implementation of the transition determination module (TDM) 114. Recall that the TDM 114 operates to determine, at each current time step, state transition decisions that can be taken to satisfy the demand identified by the prediction module 112. The TDM 114 then commences that subset of state transition decision which begin in the current step, 0.

The TDM 114 can include (or can be conceptualized to include) two component modules: an objective formulation module 502 and a solver module 504. The objective formulation module 502 expresses an objective function to be operated on to determine the state transitions. This objective function includes at least two components: a demand difference component (E) and a cost component (C) (to be described below). A solver module 504 iteratively operates on the objective function using a solving technique to achieve some goal (e.g., a minimization goal), to thereby provide the state transitions.

Figure 6:
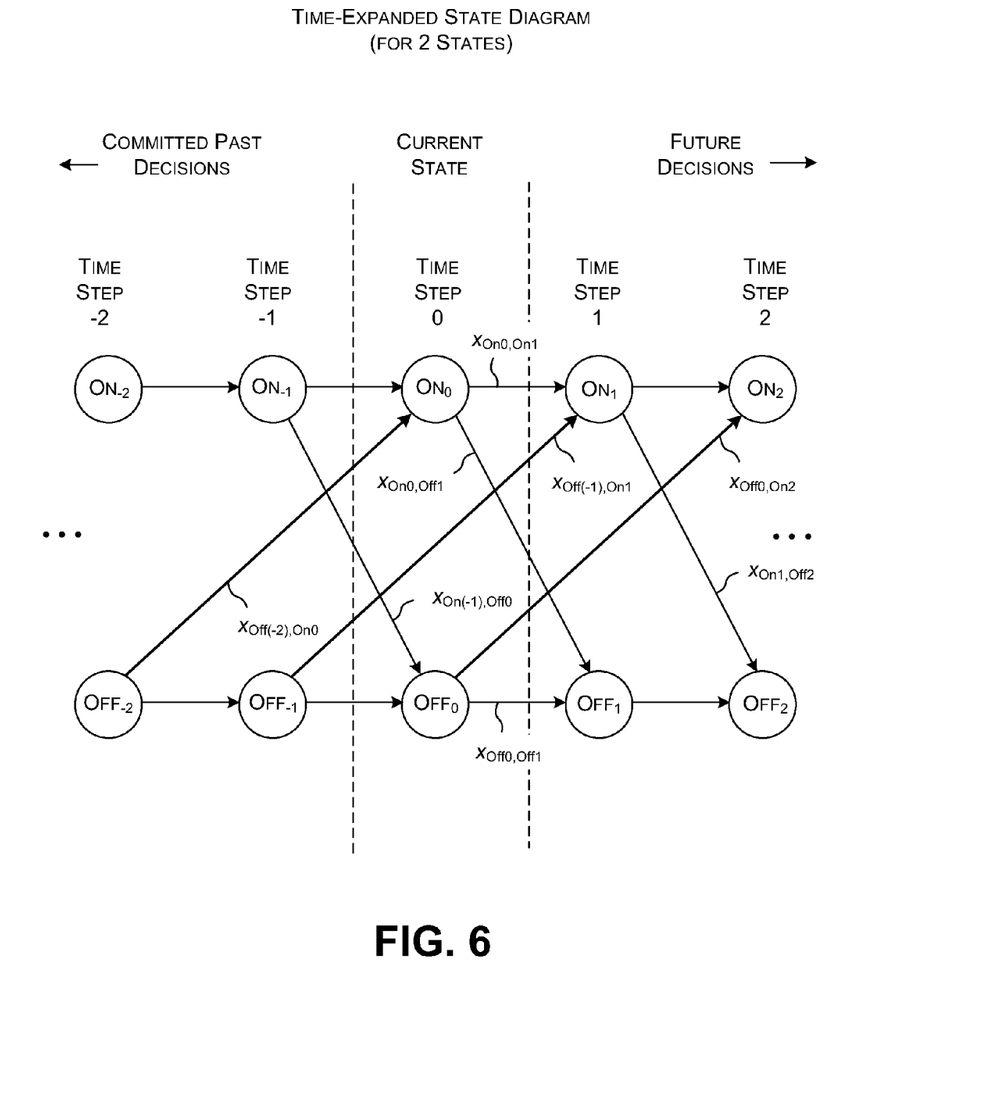
FIG. 6 shows a temporal extension of the two-state diagram of FIG. 2.
Figure 7:
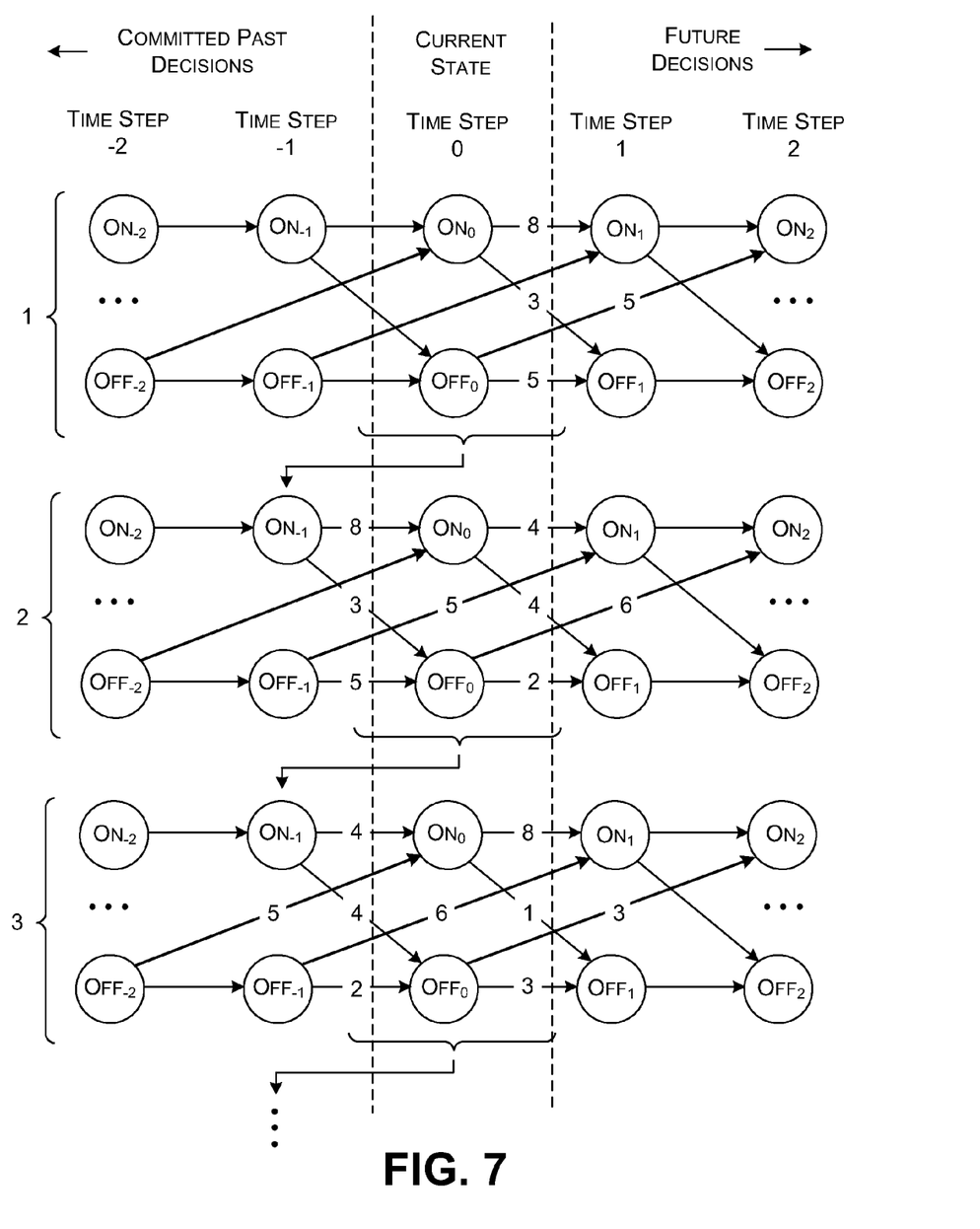
FIG. 7 shows the temporal extension of FIG. 6 as applied to three successive time steps.

The operation of the TDM 114 can be most readily conveyed by first describing the state diagrams shown in FIGS. 6 and 7. Beginning with FIG. 6, this figure shows a state diagram corresponding to the two-state model shown in FIG. 2, which includes an On state (in which the units 110 are powered on) and an Off state (in which the units 110 are powered off). That is, FIG. 6 shows the two-stage diagram of FIG. 2 temporally expanded over a series of time steps. The current time step is time step 0. Prior time steps reflect events that have already occurred, and are given negative values. Positive time steps reflect events that have yet to occur, and are given by positive values.

FIG. 6 forms a directed graph in which edges (associated with state transitions) connect nodes (associated with states).

As explained above, each state transition can be represented as $x_{s_i\mu_j}$. This decision identifies a number of units that are transitioned from a first state (s) at time step (i) to a second state (u) at time step (j). For example, FIG. 6 shows one edge that connects an Off-state node at time step −2 to an On-state node at time step 0. This path encompasses two time units because it takes two time units to turn a unit from the Off state to the On state. The number of units being transitioned along this path is denoted by $x_{off_{-2}On_0}$. FIG. 6 shows another edge that connects an On-state node at time step −1 to an Off-state node at time step 0. This path encompasses one time unit because it takes one time unit to turn a unit from the On state to the Off state. The number of units being transitioned along this path is denoted by $x_{on_{-1}off_0}$. These two paths are examples of transitions that have been commenced in the past. In one implementation, transitions that have already begun are considered as committed decisions that cannot be revoked. Less formally stated, in one implementation, the control system 102 does not attempt to change the behavior of a unit that is in the course of being turned from Off to On, or from On to Off.

Another series of paths represent state transitions that occur in the present time step and terminate in some future time step. For example, a path $x_{On_0On_1}$ represents a decision to maintain a number of units in the On state. A path $x_{Off_0Off_1}$ represents a decision to maintain a number of units in the Off state. A path $x_{Off_0On_2}$ represents a decision to turn a number of units from the Off state to the On state. And a path $x_{On_0Off_1}$ represents a decision to turn a number of units from the On state to the Off state. Again, each of these decisions takes a finite amount of time to perform.

Another series of paths represents state transitions that commence in the future and terminate in the future (with respect to the vantage point of the current time step). For example, a path $x_{On_1Off_2}$ represents a provisional decision to turn a number of units from the On state to the Off state, commencing in time step 1 and terminating in time step 2.

Given the above context, assume that the TDM 114 is operating at the current time step 0. The TDM 114 operates to determine the values ($x_{s_i\mu_j}$) for the state transitions that are not already fixed (e.g., the state transitions that have not already commenced). A subset of those state transitions will commence in the current time step, and a subset of those state transitions will commence in a future time step. The TDM 114 follows through by carrying out the state transition decisions which begin in the current time step.

For example, consider the state diagram shown in FIG. 7. This diagram duplicates the timing diagram of FIG. 6 for three different successive time steps. In a first current time step, the TDM 114 makes a decision to maintain 8 units in the On state, and 5 units in the Off state. The TDM 114 also makes a decision to transition 5 units from the Off state to the On state, and 3 units from the On state to the Off state.

Having made the decisions in the current time step (in the topmost portion of FIG. 7), these decisions become fixed past decisions. For example, in the middle portion of the FIG. 7, the prior decisions are shown as commencing from time step −1. In the now current time step (time step 0), the TDM 114 makes a new decision to maintain 4 units in the On state, and 2 units in the Off state. The TDM 114 also makes a decision to transition 6 units from the Off state to the On state, and 4 units from the On state to the Off state. These new decisions are influenced by both the current predicted future demand (as provided by the prediction module 112) and the past decisions already invoked by the TDM 114. This process continues for each current time step, with the decisions made in the previous current time step "sliding" back into time, where they appear as decisions that were made in time step −1.

Note that the FIG. 7 does not represent any state transition which commences prior to the −2 time step. This is because, in the model of FIG. 2, no state transition takes more than two time steps to complete, and therefore no such state transition can affect the current time step, at least directly. Likewise, FIG. 7 does not represent any state transition which terminates prior to the current time step (such as a decision to turn a unit, in time step −2, from the On state in time step −1). Again, this is because these decisions do not directly impact what is happening in the current time step.

With the above introduction, note that each node has edges both entering and leaving it. Each of the edges has an associated value: if an edge is entering a node, this value represents the number of machines transitioning to the state $s_j$; if the edge is leaving the node, this value represents the number of machines transitioning from state $s_j$ to some other state. A conservation equation applies to each such node:

$$\sum_{k>j} x_{s_j u_k} - \sum_{i<j} x_{r_i s_j} = 0.$$

This equation means that the sum of the machines transitioning to state $s_j$ is equal to the sum of the machines transitioning from state $s_j$ to some other state. This equation assumes that the number of units that remain available to the target system 104 remains constant over time. This is considered to be true in the following analysis to facilitate explanation, but there is no technical requirement that it hold true. If this rule does not apply, then the above equation can be modified at each instance of analysis to take account for the removal of units (e.g., because these units have failed) and/or the introduction of new units.

The above conservation equations can be grouped into the categories outlined above. Namely, state transitions $x_{s_i On_j}$, for i<0, represent state transitions that have already commenced. These state transitions represent constants, rather than variables to be determined. State transitions $x_{s_i On_j}$, for i≥0, represent state transitions which have not commenced yet. These state transitions represent variables to be determined. The conservation equation for an individual node can therefore be expressed in more detailed fashion as:

$$\underbrace{\sum_{k>j} x_{s_j u_k} - \sum_{i\geq 0} x_{r_i s_j}}_{variables} - \underbrace{\sum_{i<0} x_{r_i s_j}}_{past(fixed)} = 0.$$

Moving the past decision over to the right-hand side of the equation yields:

$$\sum_{k>j} x_{s_j u_k} - \sum_{i\geq 0} x_{r_i s_j} - \sum_{i<0} x_{r_i s_j} = b_{ij}.$$

Again, there is one such equation for each node in the state transition diagram. These equations can be expressed in aggregate as:

$Ax=b.$

The aim of the TDM 114 is to solve for the unknown variables in this expression. The TDM 114 performs this task by providing an objective function that expresses constraints on the unknown variables; then the TDM 114 uses a solving technique to operate on the objective function to iteratively solve for the unknown variables. In one implementation, the objective function includes a demand difference component (E) expressed as:

$$E = \sum_j |m_j - On_j| = \sum_j e_j.$$

In this expression, $e_j = m_j - On_j$ represents a difference between unit demand ($m_j$) at time step j and the ability to meet that demand at time step j. The difference component sums this term over all time steps. $On_j$ represents the number of units that are in the On state at step j, and may be given by:

$$On_j = \sum_i x_{s_i On_j}.$$

This equation means that the number of units that are considered as On at time step j is equivalent to the sum of the state transitions which terminate in the On node step j.

The objective function can also include a cost component (C). The cost component can represent a collective cost of a particular proposed set of state transitions. The cost can be presented by:

$$C = \sum_{i \geq 0} p_{s_i u_j} x_{s_i u_j}.$$

This equation means that a state transition $x_{s_i u_j}$ (which, in turn represents a number of machines being transitioned from state $s_i$ at time step i to state $u_j$ at time step j) is multiplied by a cost value ($p_{s_i u_j}$) assigned to this transition; this product is then summed for all state transitions, i≥0. The cost value associated with a transition of a machine from an On state in the current time step to an On state in the next time step corresponds to the cost of running the machine in that time interval (e.g., from time step 0 to time step 1). In the above expression, the cost value $p_{s_i u_j}$ can represent the amount of energy consumed in advancing from state $s_i$ to state $u_j$. In addition, or alternatively, this cost value can encompass other considerations, such as a reliability metric. For example, there may be a risk of producing an error in advancing from one state to another. This risk can be formulated in terms of a reliability cost.

The solver module 504 of the TDM 114 can operate on the objective functions in different ways. In one case, the solver module 504 can operate by first minimizing the demand difference component (E). Once this is performed, there may be remaining degrees of freedom. The solver module 504 leverages these remaining degrees of freedom by then minimizing the cost component (C). This minimization is subject to one or more constraints. One constraint may be the system of conservation equations developed above, namely Ax=b. Other optional constraints can be added, such as one or more absolute value-type constraint equations. In another case, the solver module 504 can operate on E and C by minimizing a weighted combination of E and C, e.g., αE+βC, where α and β are weighting parameters selected to convey the relative importance of satisfying the E component and the C component, respectively The solver module 504 can use any technique to perform the above-described minimization task. In one case, the solver module uses an integer programming technique, which takes, in worse case, exponential time to complete. In another case, the solver module 504 uses the more efficient linear programming technique which takes, at worse case, polynomial time to complete. More specifically, the solver module 504 can use a linear programming technique in those situations in which all feasible solutions are guaranteed to be integer-valued. This conclusion applies to the equations presented above.

A.4. Heterogeneous Units

Figure 8:
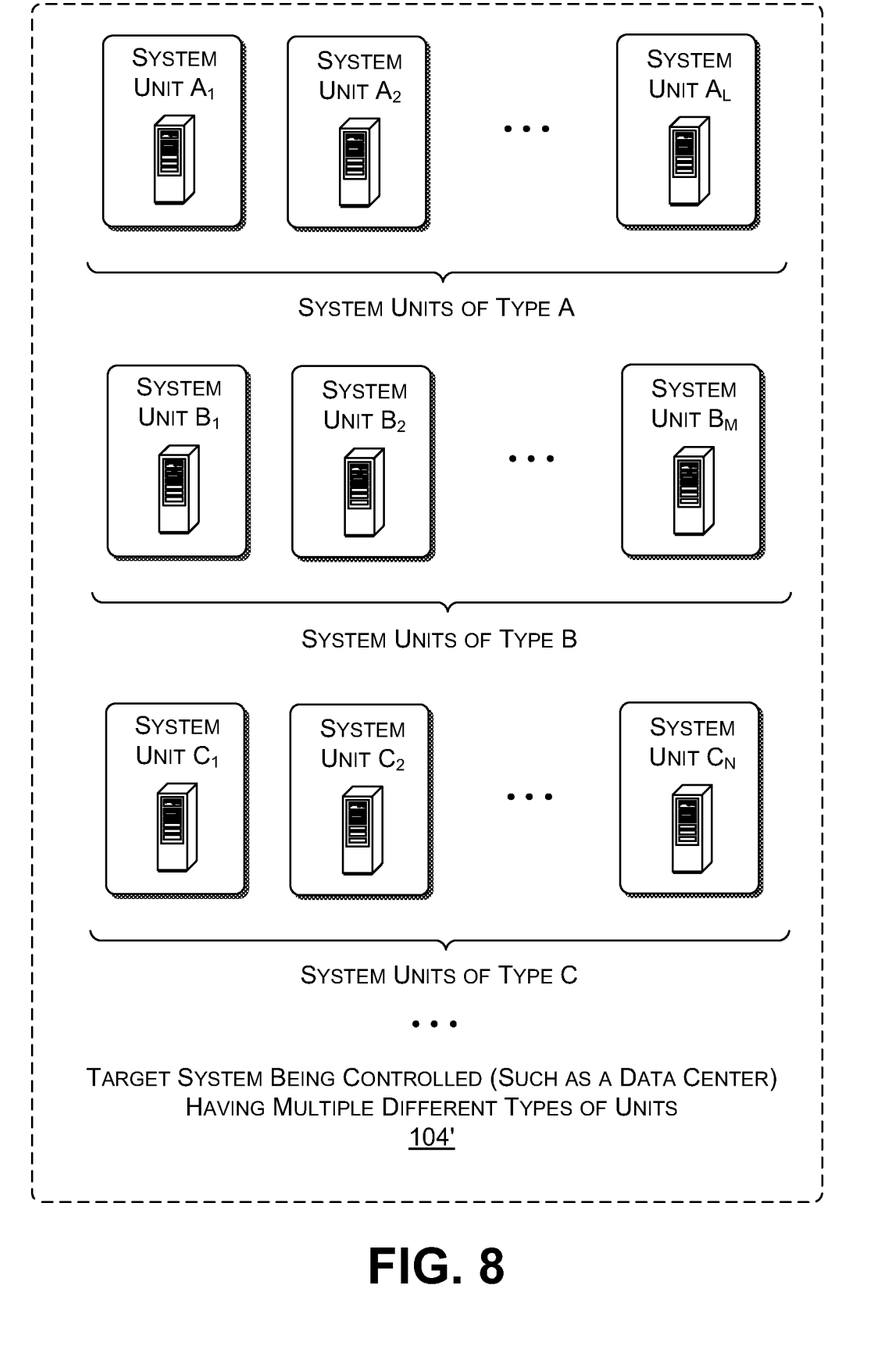
FIG. 8 shows a target system to be controlled that includes heterogeneous computing units.

In the above description, it is assumed that all of the units 110 have the same characteristics; further, all of the units 110 are governed by the same state diagram. This section describes the case in which the target system 104 can include different types of units that exhibit different respective behaviors (and are described by different respective state diagrams). For example, as shown in FIG. 8, the target system 104' can include a first type A of unit, e.g., corresponding to units $A_1$-$A_L$, a second type B of unit, e.g., corresponding to units $B_1$-$B_M$, a third type C of unit, e.g., corresponding to units $C_1$-$C_N$, and so on. For example, types A and B may correspond to two different kinds of servers. Type C may correspond to a type of network card, and so on. More generally, assume that the target system 104' includes n different types of units, each potentially described by a different state diagram.

In the heterogeneous case, the prediction module 112 operates by specifying future demand (for time steps 1, . . . k) for each different type of unit. For example, the prediction module 112 may specify that, at a given time step, there is a demand for three units of type A, two units of type B, and five units of type C, etc.

The TDM 114 operates by first building n state diagrams for the n respective different types of units. The TDM 114 can express the conservation equations for the heterogeneous case as:

$$\begin{bmatrix} A_1 & 0 & 0 \\ 0 & \ddots & 0 \\ 0 & 0 & A_n \end{bmatrix} x = b.$$

Here, $A_1$-$A_n$ represents different A matrices, one for each type of unit. The symbol x represents a vector containing all of the edges (state transitions) in all of the n directed graphs.

The energy component (E) for the heterogeneous case is:

$$E_n = \sum_{g=1}^{n} \sum_j |_g m_j - \alpha_g \, _g On_j| = \sum_j e_j.$$

In the heterogeneous case, $_g On_j$ is given by:

$$_g On_j = \sum_i {_g x_{s_i On_j}}.$$

In other words, the demand difference component $E_n$ provided above represents the aggregate effect of the individual demand difference components associated with the different types of units. The symbol $_g x_{s_i O n_j}$ represents a state transition value taken from the $g^{th}$ unit transition graph. The weight $a_g$ represents a relative importance of meeting demand for a unit of type g.

The TDM 114 computes the cost component C, by aggregating the individual cost components associated with different graphs:

$$C_n = \sum_{g=1}^{n} \sum_{i \geq 0} {_g p_{s_i u_j}} \; {_g x_{s_i u_j}}.$$

The solver module 504 can solve the objective function (that includes the E and C components) in any manner described above, such as by operating on E and C in series, or operating on a weighted combination of E and C, etc.

B. Illustrative Processes

Figure 9:
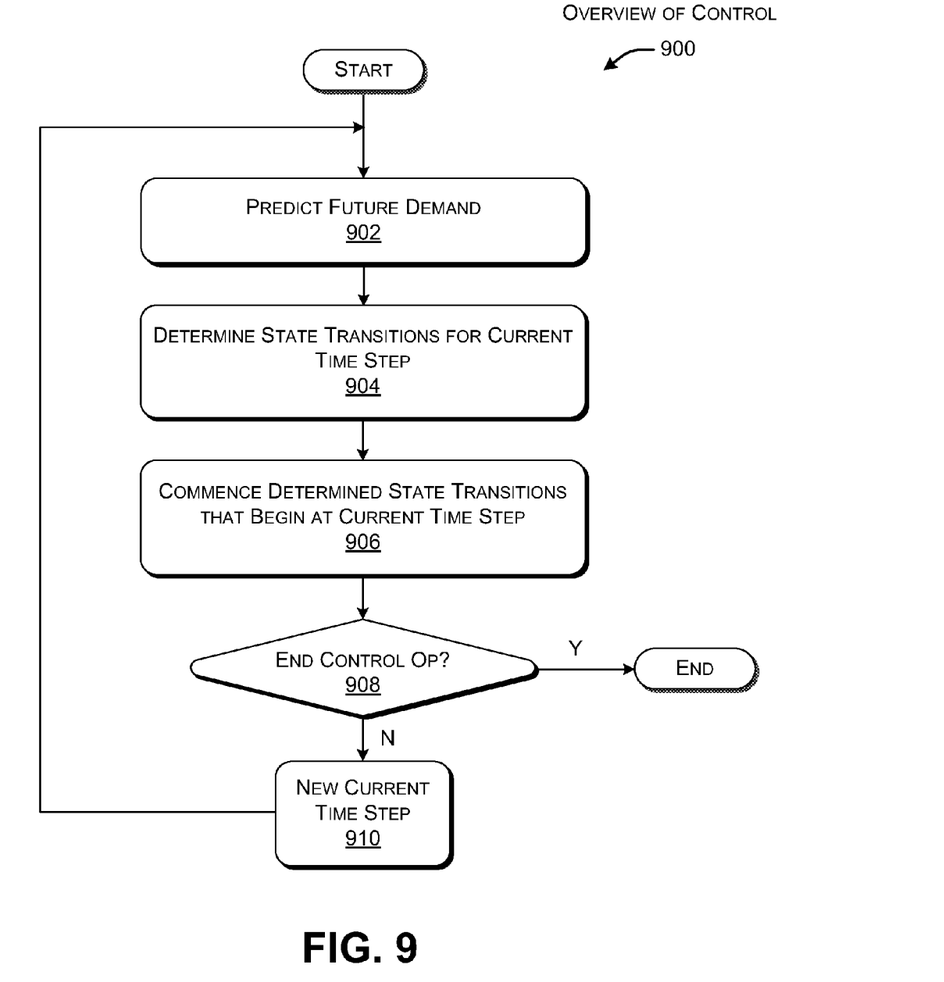
FIG. 9 is an illustrative procedure which describes one manner of operation of the control system of FIG. 1.
Figure 10:
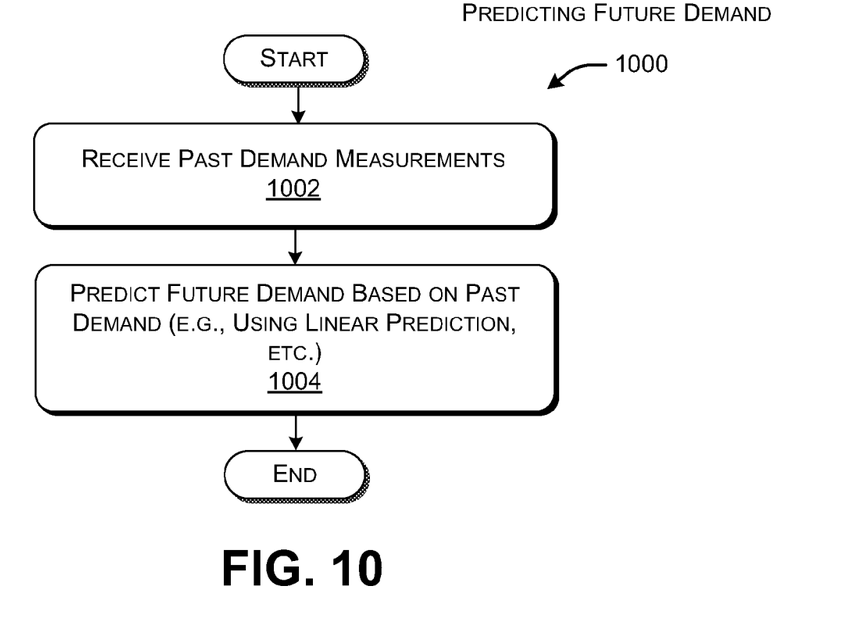
FIG. 10 is an illustrative procedure which describes one manner of operation of the prediction module of FIG. 4.
Figure 11:
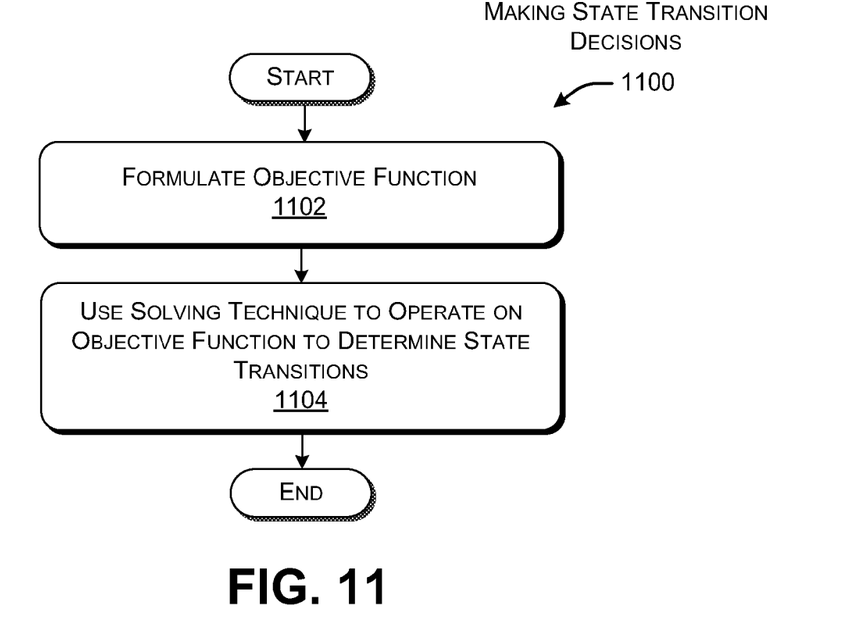
FIG. 11 is an illustrative procedure which describes one manner of operation of the transition determination module of FIG. 5.

FIGS. 9-11 show procedures (900, 1000, 1100) that describe the operation of the control system 102 of FIG. 1. Since the principles underlying the operation of the control system 102 have already been described in Section A, certain operations will be addressed in summary fashion in this section.

Starting with FIG. 9, this figure shows an overview of one manner of operation of the control system 102 of FIG. 1.

In block 902, for a current time step, the prediction module 112 predicts future demand for a plurality of future time steps, 1, . . . k.

In block 904, for the current time step, the TDM 114 determines state transitions that address the predicted future demand.

In block 906, the TDM 114 commences the state transitions determined in block 904, e.g., with respect to those transitions which begin in the current time step.

In block 908, the control system 102 determines whether its controlling operation has been terminated. If not, in block 910, the control system 102 advances to the next current time step and repeats the above-described operations with respect to the new current time step.

FIG. 10 shows an overview of the operation of the prediction module 112, according to one illustrative implementation.

In block 1002, the prediction module 112 receives a collection of demand measurements. The demand measurements express past demand for services offered by the target system 104.

In block 1004, the prediction module 112 predicts future demand for a plurality of future time steps (1, . . . k) based on the past demand. The prediction module 112 can use a linear prediction technique or any other technique or combination techniques to perform this operation.

FIG. 11 shows an overview of the operation of the TDM 114, according to one illustrative implementation.

In block 1102, the TDM 114 can formulate the problem to be solved in term of an objective function. That objective function can include a demand difference component (E) and a cost component (C).

In block 1104, the TDM 114 operates on the objective function (subject to the conservation equations and other possible constraints) to iteratively achieve some processing goal, such as minimization. This processing yields the unknown state transitions. In other words, in the context of the state diagrams shown in FIGS. 6 and 7, the TDM 114 solves for the unknown values assigned to the edges. In one approach, the TDM 114 can use a linear programming technique to operate on the objective function.

C. Representative Processing Functionality

FIG. 12 sets forth illustrative electrical data processing (computing) functionality 1200 that can be used to implement any aspect of the functions described above. With reference to FIG. 1, for instance, the type of processing functionality 1200 shown in FIG. 12 can be used to implement any aspect of the control system 102. The processing functionality 1200 can also represent any individual unit in the target system 104 to be controlled. In one case, the processing functionality 1200 may correspond to any type of computing device that includes one or more processing devices.

The processing functionality 1000 can include volatile and non-volatile memory, such as RAM 1002 and ROM 1004, as well as one or more processing devices 1006. The processing functionality 1000 also optionally includes various media devices 1008, such as a hard disk module, an optical disk module, and so forth. The processing functionality 1000 can perform various operations identified above when the processing device(s) 1006 executes instructions that are maintained by memory (e.g., RAM 1002, ROM 1004, or elsewhere). More generally, instructions and other information can be stored on any computer readable medium 1010, including, but not limited to, static memory storage devices, magnetic storage devices, optical storage devices, and so on. The term computer readable medium also encompasses plural storage devices.

The processing functionality 1000 also includes an input/output module 1012 for receiving various inputs from a user (via input modules 1014), and for providing various outputs to the user (via output modules). One particular output mechanism may include a presentation module 1016 and an associated graphical user interface (GUI) 1018. The processing functionality 1000 can also include one or more network interfaces 1020 for exchanging data with other devices via one or more communication conduits 1022. One or more communication buses 1024 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for controlling operation of a target system, the target system having a plurality of units to be controlled, the method comprising:

for a current time step, predicting demand for resources of the target system, to provide predicted demand for a plurality of future time steps;

for the current time step, determining state transitions within the target system to address the predicted demand, to provide a plurality of state transitions;

for the current time step, commencing state transitions which begin in the current time step, each of the plurality of state transitions taking a respective time interval to perform;

and repeating the predicting, determining, and commencing for a next current time step;

said determining state transitions comprising:
  determining a sum of demand differences, each demand difference representing a difference, for a particular time step, between a unit demand and an ability to meet the unit demand, at the particular time step.

2. The computer-implemented method of claim 1, wherein the target system being controlled is a data center, and wherein the units comprise computing units that perform computing functions.

3. The computer-implemented method of claim 1, wherein said predicting comprises:
  receiving a set of demand measurements associated with past demand experienced by the target system;
  and using the set of demand measurements to provide the predicted demand.

4. The computer-implemented method of claim 1, wherein said predicting comprises using a linear prediction technique to predict demand.

5. The computer-implemented method of claim 1, wherein each state transition describes a number of units to be advanced from a first state, at a first time step, to a second state, at a second time step.

6. The computer-implemented method of claim 1, wherein said determining state transitions further comprises:
  formulating an objective function that expresses a control objective to be achieved in the target system;
  and operating on the objective function using a solving technique to achieve the control objective and provide the plurality of state transitions.

7. The computer-implemented method of claim 6, wherein the objective function has a demand difference component, wherein the demand difference component expresses the sum of demand differences, and wherein the ability to meet the unit demand represents a number of units operating in a specified state for satisfying the unit demand.

8. The computer-implemented method of claim 7, wherein the objective function also has a cost component, wherein the cost component expresses a cost associated with making the state transitions.

9. The computer-implemented method of claim 8, wherein the cost pertains to energy consumption.

10. The computer-implemented method of claim 8, wherein the cost pertains to reliability.

11. The computer-implemented method of claim 8, wherein said operating comprises operating on the demand difference component and the cost component in series.

12. The computer-implemented method of claim 8, wherein said operating comprises operating on a weighted combination of the demand difference component and the cost component.

13. The computer-implemented method of claim 6, wherein said operating is subject to a set of conservation equations, the conservation equations expressing flow constraints associated with the state transitions over a span of time.

14. The computer-implemented method of claim 6, wherein said solving technique comprises a linear programming technique.

15. The computer-implemented method of claim 6, wherein the units in the target system have common behavior, and wherein the objective function is based on a modeling of this common behavior.

16. The computer-implemented method of claim 6, wherein the units in the target system include at least two types of units with different respective behaviors, and wherein the objective function is based on separate modeling of said at least two different respective behaviors.

17. A control system that includes at least one processing device, the at least one processing device including at least one memory storing instructions executable by the at least one processing device for controlling operation of a target system, the target system having a plurality of units to be controlled, the control system further comprising:
  a prediction module configured to predict, at a current time step, demand for resources of the target system, to provide predicted demand for a plurality of future time steps;
  and a transition determination module configured to determine, at the current time step, state transitions within the target system to address the predicted demand, to provide a plurality of state transitions, each state transition describing a number of units to be advanced from a first state, at a first time step, to a second state, at a second time step, the prediction module comprising:
  logic configured to receive a set of demand measurements associated with past demand experienced by the target system;
  and logic configured to use the set of demand measurements to provide the predicted demand, and the transition determination module comprising:
  logic configured to formulate an objective function that expresses a control objective to be achieved in the target system, the objective function including a demand difference component that expresses a sum of demand differences, each demand difference representing a difference, for a particular time step, between a unit demand and an ability to meet the unit demand, at the particular time step;
  and logic configured to operate on the objective function using a solving technique to achieve the control objective and provide the state transitions.

18. The control system of claim 17, wherein the target system being controlled is a data center, and wherein the units comprise computing units that perform computing functions.

19. A memory for storing computer readable instructions, the computer readable instructions providing a transition determination module when executed by one or more processing devices, the computer readable instructions comprising:
  logic configured to, at a current time step, determine state transitions within a target system to address predicted demand, to provide a plurality of state transitions by:
  formulating an objective function that expresses a control objective to be achieved in the target system, the objective function including a demand difference component that expresses a sum of demand differences, each demand difference representing a difference, for a particular time step, between a unit demand and an ability to meet the unit demand, at the particular time step,
  the objective function further including a cost component, wherein the cost component expresses a cost associated with making the state transitions, wherein said logic configured to determine state transitions is subject to a set of conservation equations, the conservation equations expressing flow constraints associated with the state transitions over a span of time; and
  operating on the objective function using a solving technique to achieve the control objective and provide the state transitions.

20. The memory of claim 19, wherein the ability to meet the unit demand represents a number of units operating in a specified state for satisfying the unit demand.

* * * * *